(12) United States Patent
Corda et al.

(10) Patent No.: US 6,526,821 B1
(45) Date of Patent: Mar. 4, 2003

(54) AIRFOIL SHAPED FLOW ANGLE PROBE

(75) Inventors: Stephen Corda, Rosamond, CA (US); Michael Jake Vachon, Rosamond, CA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 09/909,166

(22) Filed: Jul. 18, 2001

(51) Int. Cl.[7] ............................................. G01C 21/00
(52) U.S. Cl. ...................................... 73/186; 73/178 R
(58) Field of Search ............................ 73/170.12, 189, 73/170, 186, 147, 865.6, 170.01, 178 R, 866.5; 244/130

(56) References Cited

U.S. PATENT DOCUMENTS

| 3,878,714 | A | * | 4/1975 | Protta et al. ................... 73/189 |
| 4,272,043 | A | * | 6/1981 | Spillman .................... 244/130 |
| 4,836,019 | A |   | 6/1989 | Hagen |
| 5,117,687 | A | * | 6/1992 | Gerardi ....................... 73/170 |
| 5,201,218 | A |   | 4/1993 | Mole |
| 5,299,455 | A |   | 4/1994 | Mangalam |
| 5,359,888 | A |   | 11/1994 | Hagen |
| 5,369,993 | A |   | 12/1994 | Hagan |
| 5,616,861 | A |   | 4/1997 | Hagen |
| 5,663,497 | A | * | 9/1997 | Mole ........................... 73/147 |

\* cited by examiner

*Primary Examiner*—Hezron Williams
*Assistant Examiner*—Alandra N. Ellington
(74) *Attorney, Agent, or Firm*—John H. Kusmiss

(57) ABSTRACT

The present invention is a force-based instrument that measures local flow angle. The preferred embodiment of the invention has a low aspect ratio airfoil member connected to a mounting base. Using a series of strain gauges located at the connecting portion of the probe, aerodynamic forces on the airfoil member can be converted to strain, which in turn can be converted to local air flow measurements. The present invention has no moving parts and is well suited for measuring flow in a transonic and supersonic regime.

16 Claims, 3 Drawing Sheets

AIRFOIL SHAPED FLOW ANGLE PROBE

BACKGROUND OF THE INVENTION

1. Field of the Invention

The present invention relates generally to aerodynamic probes, and in particular to a low aspect ratio flow angle probe with no moving parts.

2. Description of Related Art

The flow of air around an aircraft is of the utmost importance in designing an aircraft and predicting its performance characteristics in various flight conditions. For this reason, flow angle probes were developed to measure the direction of an airflow field directly adjacent the aircraft for critical locations on the aircraft, such as the wing, tail, fuselage, and so forth. Conventional flow angle probes use a pivoting weather vane mechanism to determine the direction of the flow regime at the probe. Using many of these flow angle probes, a flow field can be established for a given flight condition (Mach number, dynamic pressure, angle of attack, angle of sideslip, etc.). By performing many tests and accumulating enough data, the aircraft can be characterized and future conditions can be predicted.

However, the conventional flow angle probes can result in unsatisfactory data due to their inherent limitations. First, a weather vane type probe is relatively bulky and limits how small a region can be evaluated. These conventional flow angle probes have a high aspect ratio and can affect the local flow regime, thereby countering the objective of measuring the local flow sans probe. In confined spaces, probes with moving elements may not fit or function properly. Further, the weather vane type of flow angle probe is ill-suited for transonic and supersonic regimes where many military and space aircraft fly. Local shock waves may be introduced prematurely by such probes due to their high aspect ratio. Accordingly, there is a need for a robust and dependable flow angle probe that does not have any moving parts and has a low aspect ratio, with the capability for measuring flow in a very small space.

SUMMARY OF THE INVENTION

The present invention is a flow angle probe that is force-based, i.e., it measures a force on a fin and converts the force to a strain at the base of the probe. The magnitude of the strain can be correlated to a flow direction and velocity from static load calibrations. The probe is small and can be used in tight areas to measure local flow regimes. It is comprised of a small, aerodynamically shaped low aspect ratio fin that has a symmetric airfoil section and a wedge shaped leading and trailing edge. Four strain gauges are mounted on the upper and lower surfaces of the neck between the fin and the mounting base, and the four strain gauges are inter-connected to form a full Wheatstone bridge. The strain gauges on the probe measure the strain on the fin. The output strain is correlated to the normal force on the fin, which in turn is converted to a local flow angle.

BRIEF DESCRIPTION OF THE DRAWINGS

The exact nature of this invention, as well as its objects and advantages, will become readily apparent upon reference to the following detailed description when considered in conjunction with the accompanying drawings, in which like reference numerals designate like parts throughout the figures thereof; and wherein.

DESCRIPTION OF THE PREFERRED EMBODIMENTS

Figure 2:
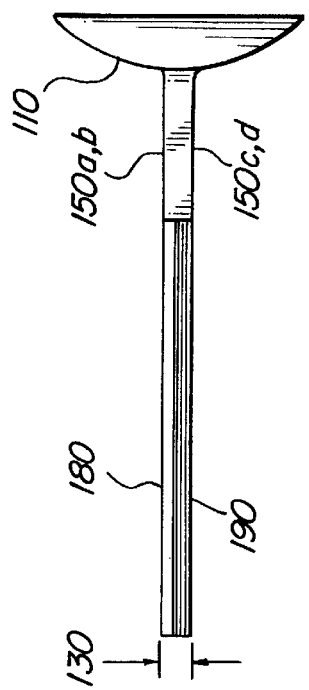
FIG. 2 is a side view of the flow angle probe of FIG. 1.
Figure 4:
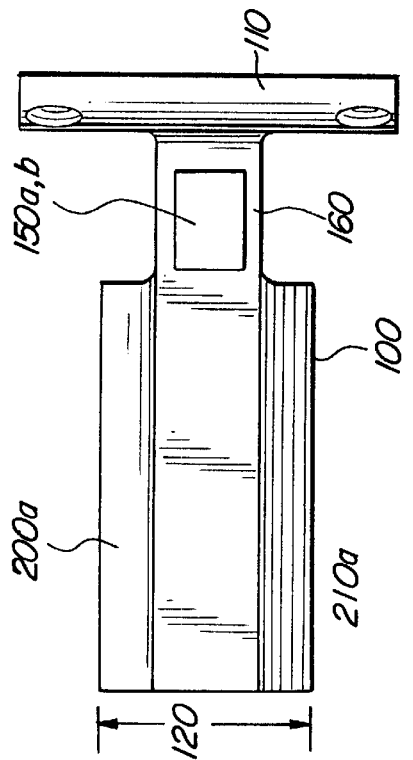
FIG. 4 is a top view of the flow angle probe of FIG. 1.
Figure 1:
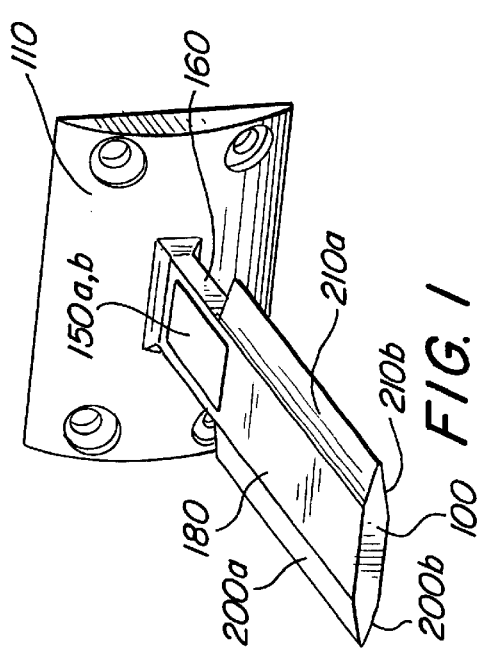
FIG. 1 is an elevated, perspective view of the flow angle probe of the present invention.
Figure 3:
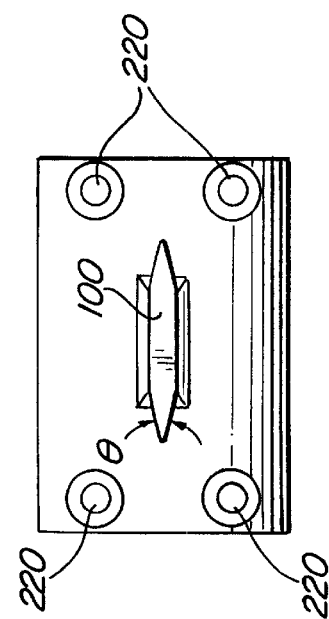
FIG. 3 is a front view of the flow angle probe of FIG. 1.

The following description is provided to enable any person skilled in the art to make and use the invention and sets forth the best modes contemplated by the inventor of carrying out their invention. Various modifications, however, will remain readily apparent to those skilled in the art, since the general principles of the present invention have been defined herein specifically to provide a low aspect ratio flow angle probe for an aircraft with no moving parts.

The present invention is shown generally in FIGS. 1 to 4. It comprises a cantilevered airfoil shaped member 10 extending perpendicularly from an arched mounting base 110. It may be constructed of any suitable material, such as 2024-T351 aluminum. The span of the airfoil member 10 is approximately 2 inches, although as described below much smaller probes are possible. For the two inch span airfoil member, the chord 120 is approximately one inch and the airfoil member has a thickness 130 of approximately one-eighth of an inch. A suitable wedge angle θ of the airfoil member is approximately twelve degrees (semi-apex).

In a preferred embodiment, the airfoil member 10 includes a shaped fin 100 comprising a generally flat surface 180 and a parallel flat lower surface 190 which extend to the neck portion 160. The fin 100 will typically be symmetric with respect to both X and Y axes, and comprise leading and trailing edges of two inclined planes 200a–b, 210a–b, respectively. The leading edge inclined planes 200a,b converge to form an apex angle θ, which is preferably symmetric with the apex angle formed by the inclined planes 210a,b of the trailing edge. The fin 100 narrows at a first end to form a neck portion used to support the strain gauges and to transition from the load bearing surfaces to a mounting base 110. The neck portion 160 may be rectangular in cross-section and of sufficient thickness to support the cantilevered fin 100 without deformation under the most adverse load conditions.

The airfoil member 10 mounts to a base 110 which may have a curved first surface and a flat mounting surface. The flat mounting surface can be used to mount the base 110 flush against an aircraft component or a location on a ship hull. The curved first surface provides thickness to the base 110 to support four holes 220 sized to accept a fastener to secure the base 110. The holes have a recessed annular shoulder to receive the end of the fasteners to keep the fasteners from interfering with the flow regime. Other means for securing the base are possible, such as adhesives.

The juncture between the neck portion of the airfoil member and the base include rounded transitions to reduce stress concentrations and promote flow over the neck portion of the probe.

The probe includes four strain gauges 150a–d located on the upper and lower surfaces of the neck portion 160 of the airfoil member 10. The strain gauges output a voltage signal indicative of the load on the probe. The voltage signals from the strain gauges 150a–d are conditioned and amplified by a signal conditioning component (not shown). A power source (not shown) is also preferably cooperating with the strain gauges 150a–d to provide an excitation voltage. Calibration of the flow angle measurement is achieved utilizing in-flight data or wind tunnel data. Verification of the present invention has been confirmed with measured angle of flow data acquired by a symmetric angle of flow weather vane probe.

Figure 5:
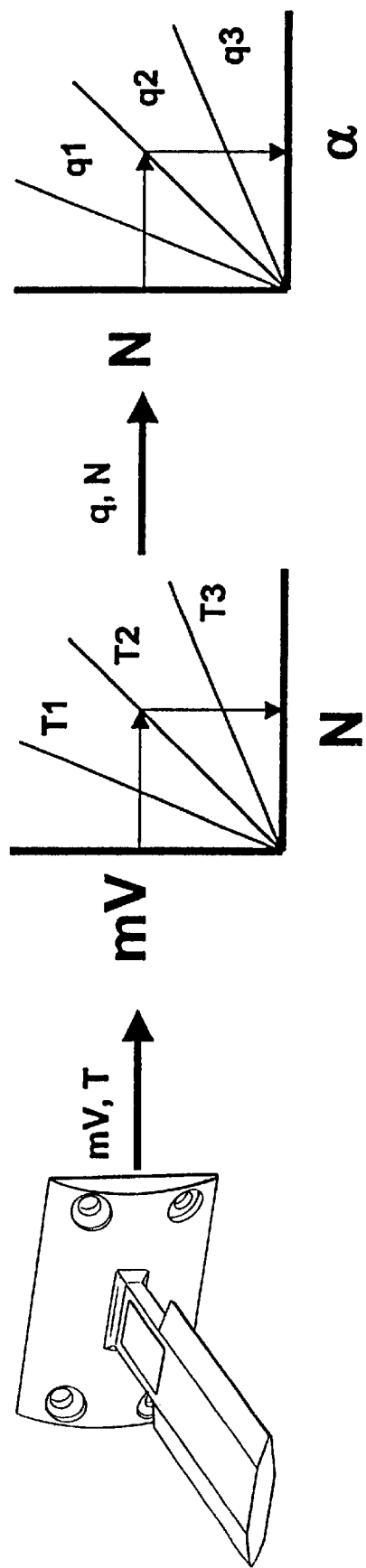
FIG. 5 is a schematic outline of steps to convert strain gauge readings to flow angle; and, FIG. 6 is a chart of strain versus angles of attack for several dynamic pressures.

FIG. 5 illustrates the conversion from force to angle of attack (represented in the Figure as the Greek letter alpha). Aerodynamic loads on the probe due to the movement of air over the probe will produce a stress at the load bearing portion of the probe where the strain gauges are positioned. At a zero angle of attack, the airfoil member will experience a bending stress as the force on the airfoil member is applied to the leading edge of the airfoil member. At a non-zero angle of attack, the aerodynamic force on the airfoil will produce both a bending stress and a torque at the base of the probe, due to the tendency for the airfoil member to twist and bend as a result of the uneven application of aerodynamic forces on the upper and lower surfaces. The strain gauges measure the stresses as a function of millivolts (mV), and outputs the signal in millivolts to a first conversion step.

Figure 6:
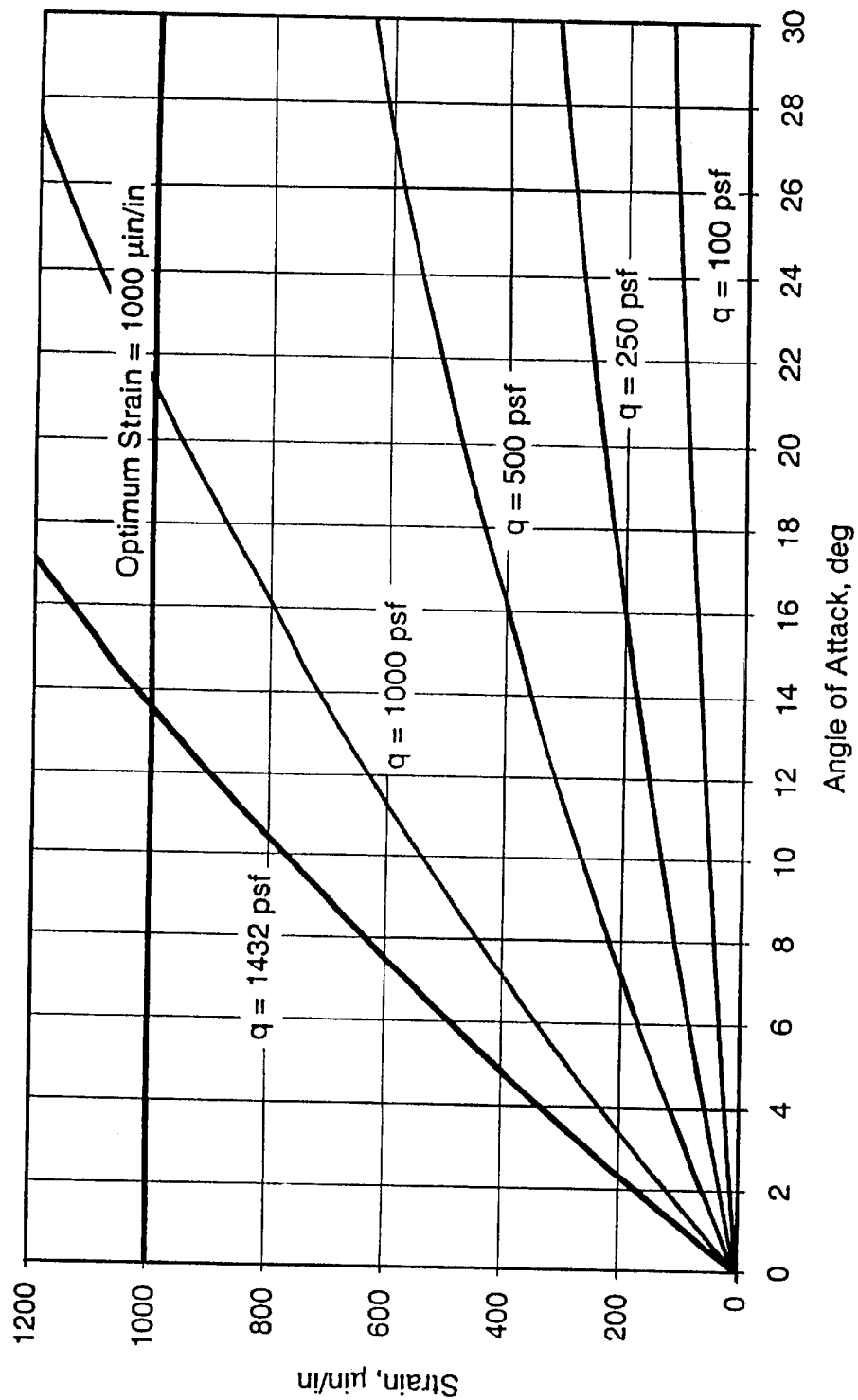

In this conversion, which is a thermal calibration, the millivolts are converted to Newtons (N) for a given temperature (T1, T2, T3, etc.). The output of this conversion is then provided to a second step where the load in Newtons is converted to a flow angle ($\alpha$) for a given dynamic pressure (q). FIG. 6 is a composite graph of the steps shown in FIG. 5, correlating strain measured by the probe with angle-of-attack for a given dynamic pressure.

To reduce the size of the probe, conventional strain gauges can be replaced with fiber optic wires much more sensitive to strain. The use of fiber optic wires would allow for the fabrication of a very small probe. A probe with strain-detecting fiber optic wires can be used to perform tests on individual streamlines in an airflow, rather than gross airflow behavior. Further, the use of a plurality of miniature probes could be used to perform quantitative tufting tests, as opposed to mere qualitative testing by conventional probes.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A probe for determining airflow direction comprising:
   a base adapted to be fixed to a moving body;
   a symmetric airfoil member having a low aspect ratio fin and a neck portion connecting the fin to the base, and
   a plurality of strain gauges located on the symmetric airfoil member at upper and lower surfaces for the neck portion, the plurality of strain gauges adapted to measure a movement induced force on the fin.

2. The probe of claim 1, wherein the probe comprises no moving parts.

3. The probe of claim 2, wherein the ratio of a chord length of the airfoil member to a thickness of the airfoil member is not greater than eight to one.

4. The probe of claim 2, wherein the strain gauges are comprised of fiber optic wires.

5. The probe of claim 2 wherein the symmetric airfoil member includes a flat upper surface parallel to a flat lower surface.

6. The probe of claim 1 wherein the strain gauges are connected to form a Wheatstone bridge circuit.

7. The probe of claim 1 where the low aspect ratio fin further comprises a leading edge and a trailing edge; where the leading edge and trailing edge have equal apex angles.

8. The probe of claim 1 wherein said base is adapted to be mounted to an aircraft.

9. The probe of claim 8 wherein the movement induced force comprises aerodynamic forces.

10. The probe of claim 1 wherein said base is adapted to be mounted to a ship.

11. The probe of claim 10 wherein the movement induced force comprises hydrodynamic forces.

12. An aerodynamic flow angle probe comprising:
    a low aspect ratio fin having flat upper and lower surfaces, a first inclined upper face and a first inclined lower face converging at a leading edge, and a second inclined upper face and a second inclined lower face converging at a trailing edge, and a neck portion extending from the flat upper and lower surfaces;
    a base for mounting the low aspect ratio fin perpendicular to a mounting surface; and
    a plurality of strain detecting fiber optic wires mounted on the low aspect ratio fin along the flat upper and lower surfaces.

13. The aerodynamic flow angle probe of claim 12 where the distance between the flat upper surface and the flat lower surface of the low aspect ratio fin is less than one eighth of one inch.

14. The aerodynamic flow angle probe of claim 12 wherein a voltage signal is produced by the fiber optic wires indicative of a force applied to the low aspect ratio fin.

15. A fluid flow probe comprising:
    a base adapted to be fixed to a moving body;
    an airfoil member having a fin, with an upper and lower surface, and a neck connecting the fin to the base; and,
    a plurality of strain-detecting fiber optic wires mounted to the upper and lower surfaces of the fin.

16. The fluid flow probe of claim 15 where the upper and lower surfaces of the fin are flat and separated by a distance of less than one eighth of one inch.

* * * * *